United States Patent [19]
Winters et al.

[11] Patent Number: 5,315,368
[45] Date of Patent: May 24, 1994

[54] OPTICAL SIGHT ENHANCING BLADE ARRANGEMENT

[76] Inventors: Charles W. Winters; Janice F. Winters, both of Rte. 1, Box 688, Bon Aqua, Tenn. 37025

[21] Appl. No.: 44,761

[22] Filed: Apr. 12, 1993

[51] Int. Cl.⁵ .................. G02B 27/34; G02B 5/10
[52] U.S. Cl. ................... 356/251; 356/252; 359/389; 359/639; 359/853
[58] Field of Search .............. 359/389, 475, 798, 799, 359/629, 631, 638, 639, 853, 727, 869, 591, 592, 597; 356/251, 252

[56] References Cited

U.S. PATENT DOCUMENTS

| | | | |
|---|---|---|---|
| 3,994,597 | 11/1976 | Calder | 356/251 |
| 4,030,839 | 6/1977 | Rickert | 359/639 X |
| 4,046,462 | 9/1977 | Fletcher | 359/853 X |
| 4,435,043 | 3/1984 | Mertens | 359/853 |
| 4,527,870 | 7/1985 | Esmay | 359/389 X |
| 4,784,700 | 11/1988 | Stern | 359/853 |
| 4,863,269 | 9/1989 | Ellis | 356/251 |
| 4,877,324 | 10/1989 | Hauri | 356/251 |
| 5,044,748 | 9/1991 | Scott | 356/251 |
| 5,052,801 | 10/1991 | Downes, Jr. | 356/251 X |
| 5,090,805 | 2/1992 | Stawarz | 356/251 |

FOREIGN PATENT DOCUMENTS 2634565  1/1990  France ................. 356/251

*Primary Examiner*—Eugene R. LaRoche
*Assistant Examiner*—Son Mai
*Attorney, Agent, or Firm*—E. Michael Combs

[57] ABSTRACT

An optical sight typically used in cooperation with a weapon is provided to include a light tube, that in turn further is provided with a blade member mounted to the light tube that includes a concave surface of mirror image reflective qualities directing light into the light tube for enhanced optical illumination through the sight arrangement.

1 Claim, 4 Drawing Sheets

OPTICAL SIGHT ENHANCING BLADE ARRANGEMENT

BACKGROUND OF THE INVENTION

1. Field of the Invention

The field of invention relates to optical sight structure, and more particularly pertains to a new and improved optical sight enhancing blade arrangement wherein the same is directed for use in an optical sight to enhance light gathering capacity to the optical sight in use.

2. Description of the Prior Art

Optical sights of various types have been utilized in the prior art such as exemplified in the U.S. Pat. No. 3,994,597 to Calder. The Calder patent employs artificial illumination structure to enhance visual observation within the sight arrangement.

The instant invention attempts to overcome deficiencies of the prior art by employing a reflective mirror structure circumventing need for artificial illumination. Such artificial illumination is typically not approved in various hunting environments and accordingly the instant invention sets forth a passive reflective structure to enhance illumination through a sight tube and in this respect, the present invention substantially fulfills this need.

SUMMARY OF THE INVENTION

In view of the foregoing disadvantages inherent in the known types of sight apparatus now present in the prior art, the present invention provides an optical sight enhancing blade arrangement wherein the same includes an arcuate mirror mounted in cooperation with a light tube relative to an optical sighting arrangement. As such, the general purpose of the present invention, which will be described subsequently in greater detail, is to provide a new and improved optical sight enhancing blade arrangement which has all the advantages of the prior art optical sight apparatus and none of the disadvantages.

To attain this, the present invention provides an optical sight typically used in cooperation with a weapon, to include a light tube that in turn further is provided with a blade member mounted to the light tube that includes a concave surface of mirror image reflective qualities directing light into the light tube for enhanced optical illumination through the sight arrangement.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved optical sight enhancing blade arrangement which has all the advantages of the prior art optical sight apparatus and none of the disadvantages.

It is another object of the present invention to provide a new and improved optical sight enhancing blade arrangement which may be easily and efficiently manufactured and marketed.

It is a further object of the present invention to provide a new and improved optical sight enhancing blade arrangement which is of a durable and reliable construction.

An even further object of the present invention is to provide a new and improved optical sight enhancing blade arrangement which is susceptible of a low cost of manufacture with regard to both materials and labor, and which accordingly is then susceptible of low prices of sale to the consuming public, thereby making such optical sight enhancing blade arrangements economically available to the buying public.

Still yet another object of the present invention is to provide a new and improved optical sight enhancing blade arrangement which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
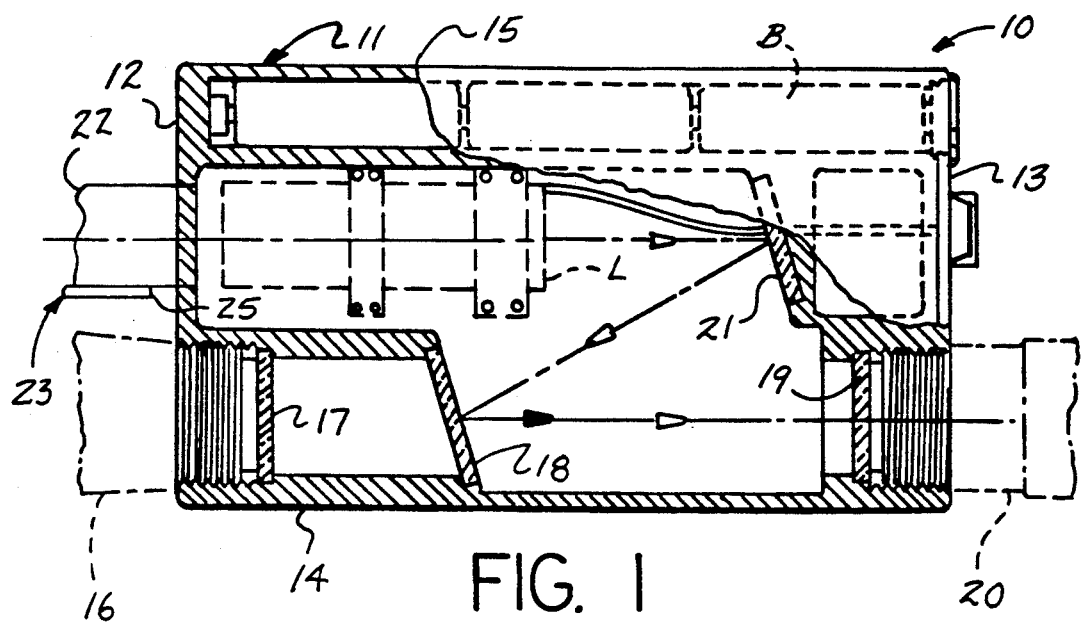
FIG. 1 is an orthographic cross-sectional illustration of the invention in cooperation with an optical sight structure.
Figure 2:
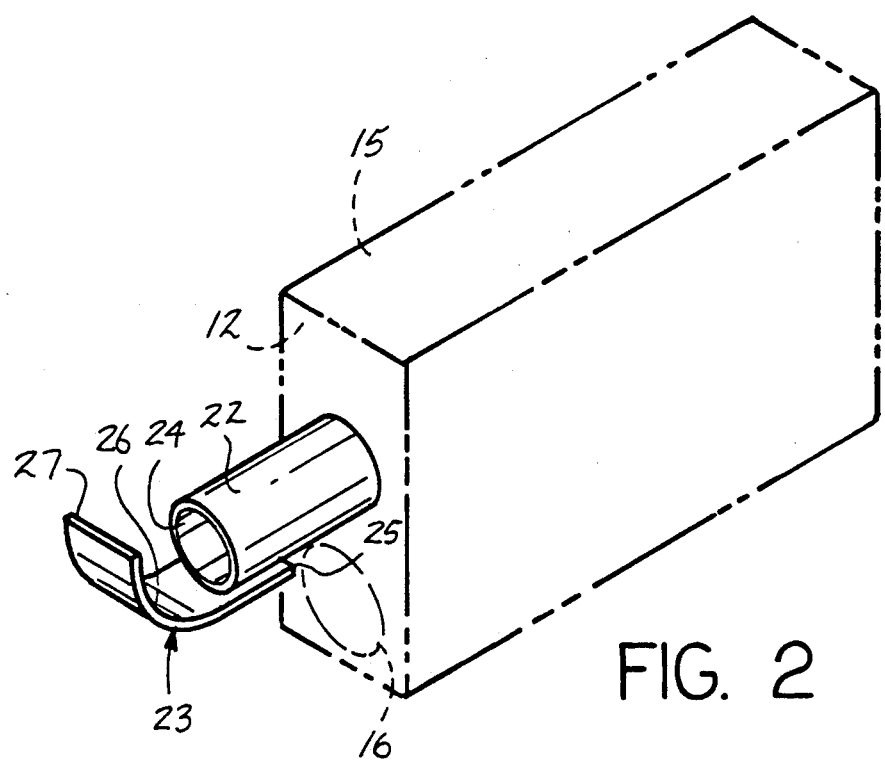
FIG. 2 is an isometric illustration of the invention emphasizing the light tube structure in cooperation with the arcuate mirror.
Figure 3:
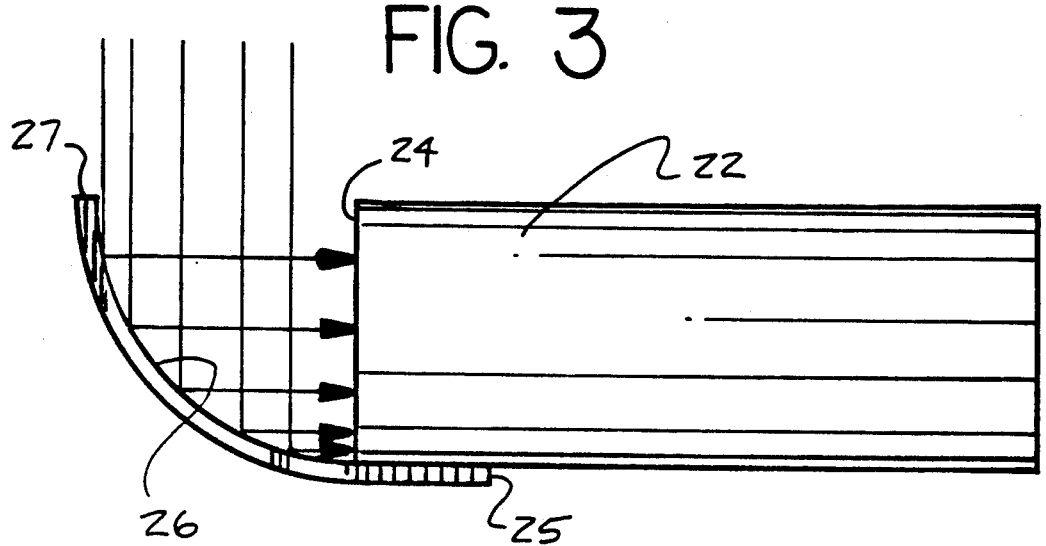
FIG. 3 is an orthographic side view of the light tube and mirror structure.
Figure 4:
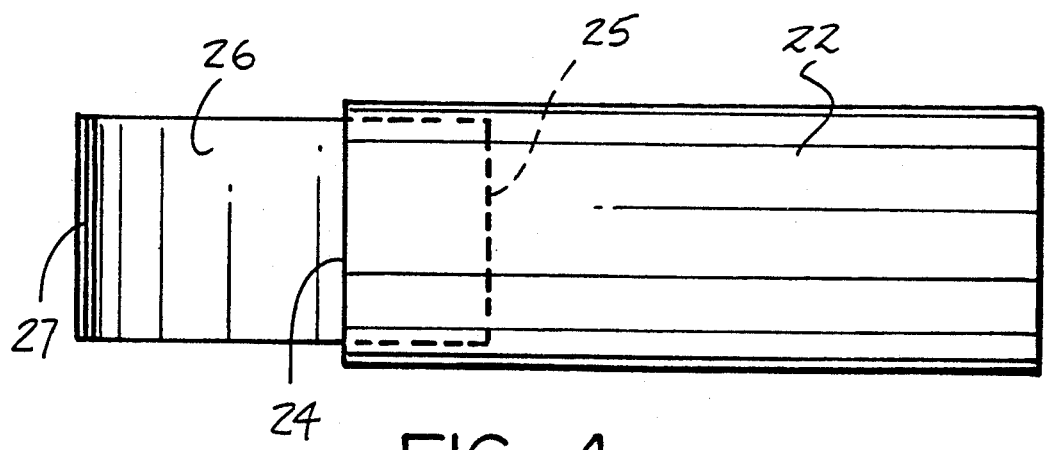
FIG. 4 is an orthographic top view of the light tube, as indicated in FIG. 3.

With reference now to the drawings, and in particular to FIGS. 1 to 8 thereof, a new and improved optical sight enhancing blade arrangement embodying the principles and concepts of the present invention and generally designated by the reference numeral 10 will be described.

More specifically, the optical sight enhancing blade arrangement 10 of the instant invention is arranged for cooperation with an optical sight structure, as indicated in U.S. Pat. No. 3,994,597 incorporated herein by reference. In lieu of the sight tube "L" in cooperation with the batteries "B", the instant invention includes a light tube 22 in cooperation with a housing 11. The housing 11 includes a housing front wall 12 spaced from a housing rear wall 13, and a housing bottom wall 14 spaced from a housing top wall 15. An objective tube 16 is directed through the front wall 12, having a first transparent window 17 directing illumination to an eyepiece tube 20 that includes a second transparent window 19 mounted in the housing in optical alignment with the objective tube 16. A beam splitter 18 is provided of a plate-like construction receiving illumination reflected from a mirror 21 mounted within the housing 11 received within the housing through the light tube 22. The light tube 22 includes a mirror plate 23 mounted to the light tube 22 and oriented between the light tube 22 and the objective tube 16 such that the mirror plate 23 includes a mirror plate first end 25 mounted to the light tube between the light tube 22 and the objective tube 16, and having a concave interior surface 26 extending over a light tube entrance opening 24 of the light tube 22 and projecting beyond the entrance opening 24 terminating in a mirror plate second end 27 oriented between the light tube 22 and the housing top wall 15. The mirror plate concave interior surface 26 is of reflective construction to project enhanced illumination interiorly of the light tube 22.

Figure 5:
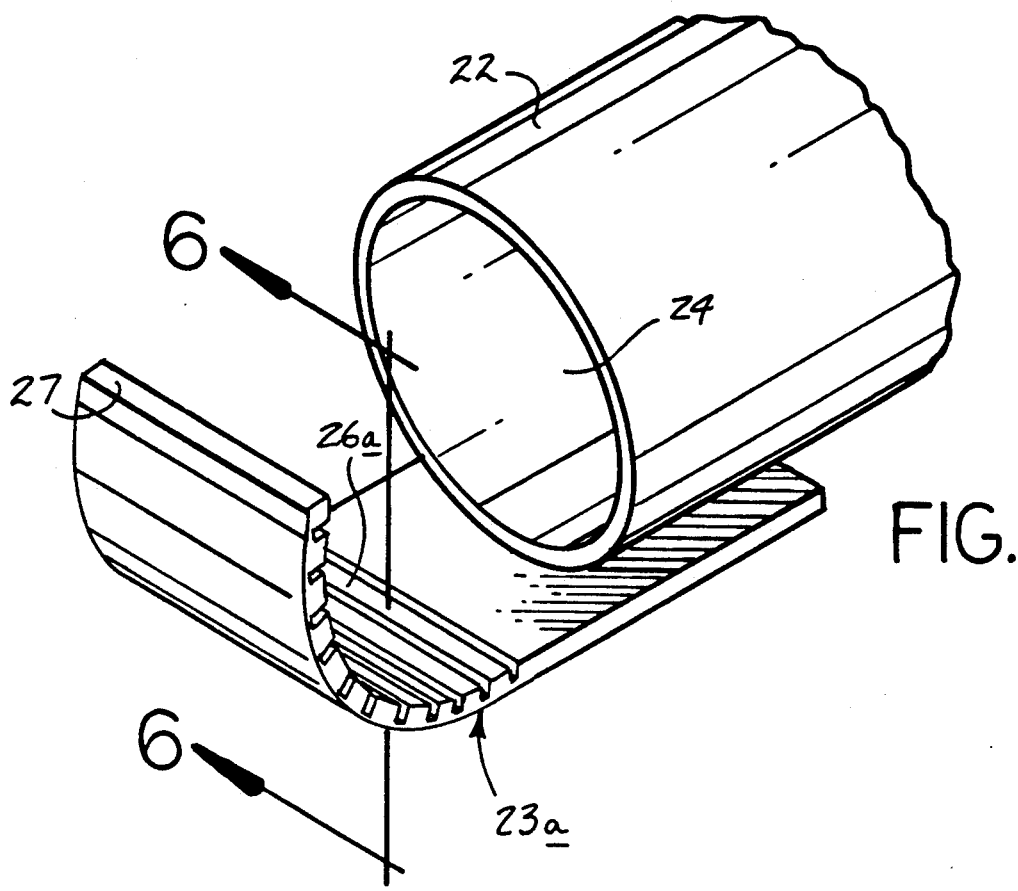
FIG. 5 is an isometric, partial view of a modified mirror plate structure as employed by the invention.
Figure 6:
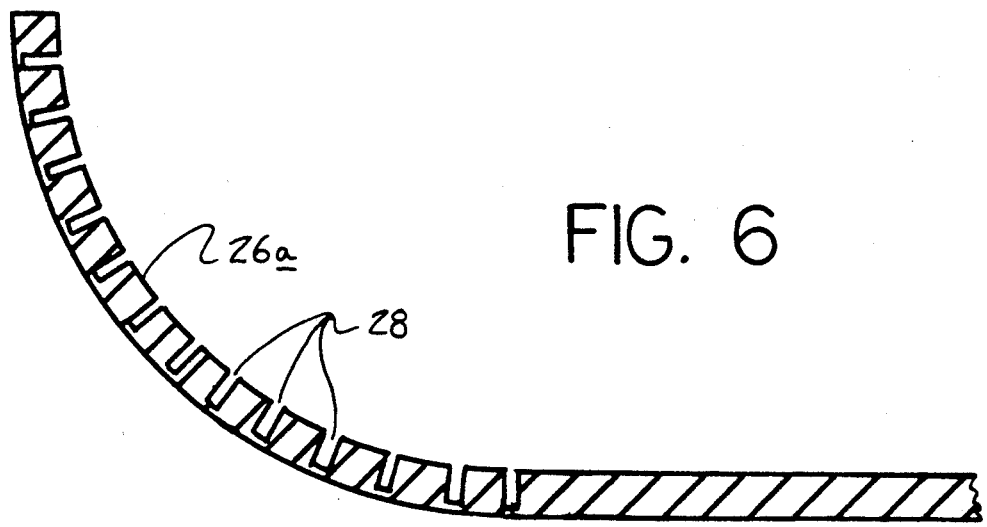
FIG. 6 is an orthographic view, taken along the lines 6—6 of FIG. 5 in the direction indicated by the arrows.

The FIGS. 5 and 6 indicate the use of a modified mirror plate 23a having the modified mirror plate concave interior surface 26 including a plurality of parallel spaced slots 28 coextensive with the concave interior surface 26a to permit bending of the mirror plate to accommodate various light conditions and finely adjust the reflective qualities of the interior surface 26a to direct such reflected light interiorly of the light tube 22 through the entrance opening 24. To this end, the modified mirror plate 23a is formed of a deformable material taking shape as bent about the slots 28 that extend orthogonally between the sides of the modified mirror plate 23a.

Figure 7:
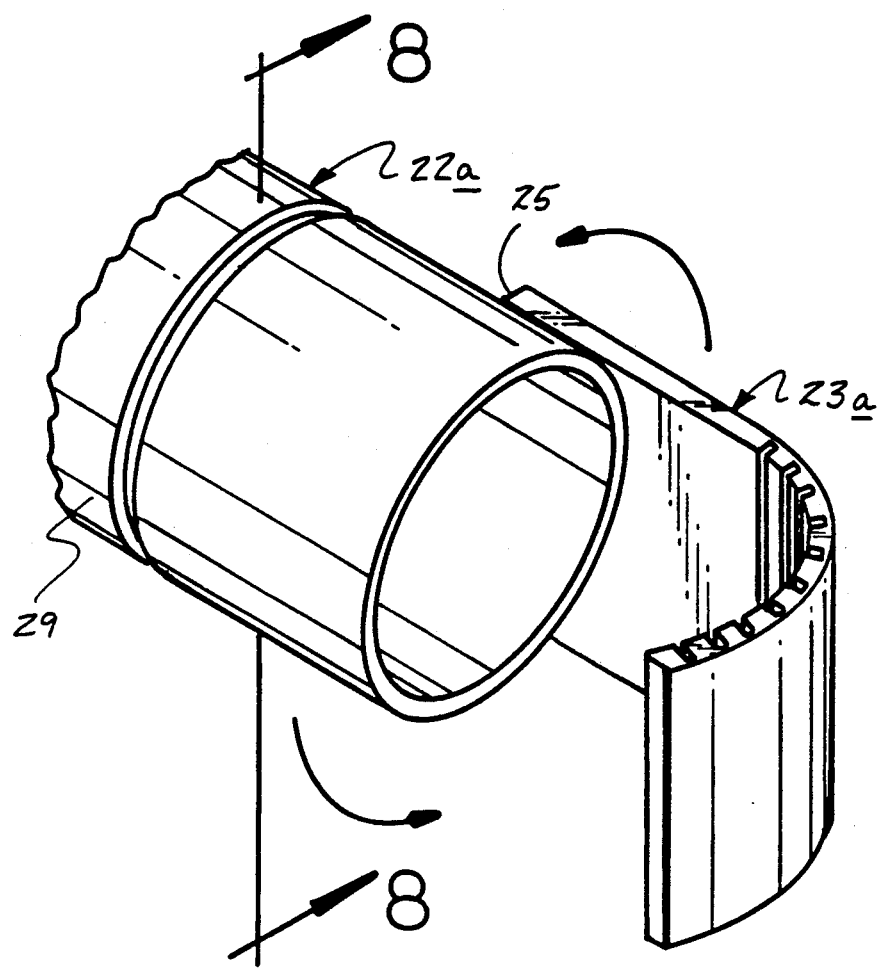
FIG. 7 is an isometric illustration of a modified light tube structure of the invention.
Figure 8:
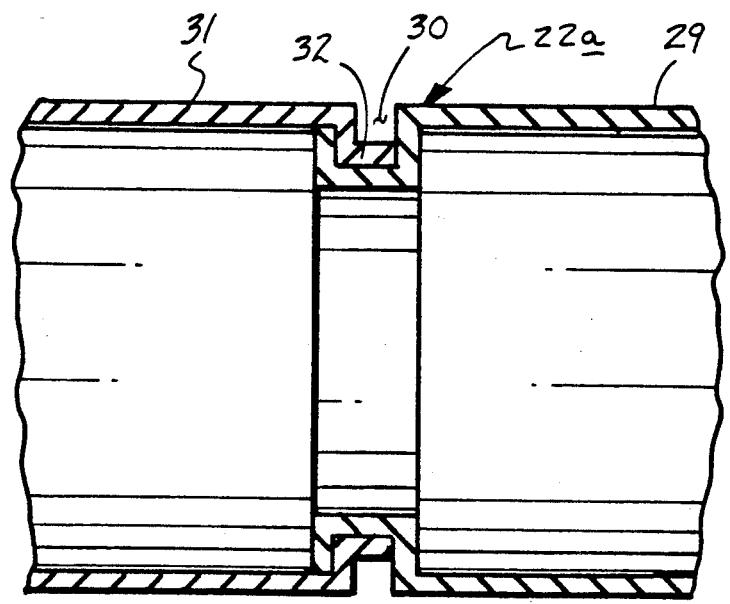
FIG. 8 is an orthographic view, taken along the lines 8—8 of FIG. 7 in the direction indicated by the arrows.

The FIGS. 7 and 8 additionally include a modified light tube 22a, having a first tube 29 terminating in an annular ring groove 30 spaced from the housing front wall 12, with the annular ring groove 30 arranged to rotatably receive a second tube ring flange 32 of a second tube 31 to permit rotation of the second tube that in turn mounts the modified mirror plate 23a, as illustrated. Orientation of the mirror plate relative to available light is thereby provided due to the rotational relationship of the second tube 31 relative to the first tube 29.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An optical sight enhancing blade arrangement in combination with a sight housing, having a housing front wall spaced from a housing rear wall, and a housing bottom wall spaced from a housing top wall, with the housing including an objective tube directed into the housing through the housing front wall, and an eyepiece tube longitudinally aligned with the objective tube, with the eyepiece tube directed into the housing through the housing rear wall, and a light tube directed into the housing through the housing front wall oriented between the objective tube and the housing top wall, with the light tube including a mirror plate fixedly mounted to the light tube, with the mirror plate adapted to direct available light into the light tube, and the light tube includes an entrance opening, and the mirror plate includes a first end secured to the light tube, and includes a second end spaced beyond the entrance opening, with the mirror plate having a mirror plate concave interior reflective surface extending in a facing relationship relative to the entrance opening, and the mirror plate includes mirror plate spaced parallel sides and a plurality of parallel slots directed into the mirror plate concave interior surface coextensively therewith, with the slots oriented orthogonally relative to the sides, and the light tube includes a first tube mounted to the housing, the first tube having an annular ring groove spaced from the housing, and a second tube, the second tube having a second tube ring flange rotatably mounted within the annular ring groove, with the second tube and the first tube coaxially aligned relative to one another, and the second tube including the mirror plate first end fixedly mounted to the second tube.

* * * * *